United States Patent
Chang et al.

(10) Patent No.: US 8,872,023 B2
(45) Date of Patent: Oct. 28, 2014

(54) MULTI-MODAL ELECTRONIC DEVICE COVER

(75) Inventors: Sheng-Kuo Chang, New Taipei (TW); Chung-Chan Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 435 days.

(21) Appl. No.: 13/354,653

(22) Filed: Jan. 20, 2012

(65) Prior Publication Data

US 2013/0146322 A1   Jun. 13, 2013

(30) Foreign Application Priority Data

Dec. 9, 2011  (TW) ............................ 100145510 A

(51) Int. Cl.
  *H05K 5/00*  (2006.01)
  *H05K 7/00*  (2006.01)
(52) U.S. Cl.
  USPC ................... 174/50; 361/679.01; 335/219
(58) Field of Classification Search
  CPC ............... A45C 2011/002; A45C 2011/003; A45C 2200/15; G06F 1/1626; G06F 2200/1634
  USPC .................. 174/50; 361/679.01; 335/219
  See application file for complete search history.

(56) References Cited

U.S. PATENT DOCUMENTS

| | | | |
|---|---|---|---|
| 2011/0221319 A1* | 9/2011 | Law et al. ...................... | 312/325 |
| 2012/0066865 A1* | 3/2012 | Lauder et al. ................... | 16/382 |
| 2012/0068919 A1* | 3/2012 | Lauder et al. ................. | 345/156 |
| 2012/0069503 A1* | 3/2012 | Lauder et al. ............ | 361/679.01 |
| 2012/0069540 A1* | 3/2012 | Lauder et al. ................. | 361/807 |
| 2012/0072167 A1* | 3/2012 | Cretella et al. ................ | 702/150 |
| 2012/0194448 A1* | 8/2012 | Rothkopf ...................... | 345/173 |
| 2012/0234716 A1* | 9/2012 | Chen ............................. | 206/472 |
| 2013/0016467 A1* | 1/2013 | Ku ........................... | 361/679.08 |
| 2013/0048517 A1* | 2/2013 | Mecchella ..................... | 206/216 |
| 2013/0063873 A1* | 3/2013 | Wodrich et al. .......... | 361/679.01 |
| 2013/0088431 A1* | 4/2013 | Ballagas et al. .............. | 345/168 |

FOREIGN PATENT DOCUMENTS

| | | |
|---|---|---|
| CN | 201758962 U | 3/2011 |
| DE | 202011101536 | 9/2011 |
| TW | 587752 | 5/2004 |
| TW | M415329 | 11/2011 |
| WO | 2004077374 A1 | 9/2004 |
| WO | 2005003875 A1 | 1/2005 |

OTHER PUBLICATIONS

Chinese Office Action, Jun. 30, 2014, 4 pages.
European Search Report, EP12163782, Mar. 8, 2013, 9 pages.
Taiwan Office Action, Nov. 8, 2013, 9 pages.

* cited by examiner

*Primary Examiner* — William H Mayo, III
*Assistant Examiner* — Rhadames J Alonzo Miller
(74) *Attorney, Agent, or Firm* — Edell, Shapiro & Finnan, LLC

(57) ABSTRACT

A cover for an electronic device includes first and second planar members wherein, a first end of the second planar member is disposed adjacent to a first end of the first planar member. The cover also includes a coupling arrangement configured to be attached to a first end of the electronic device and configured to permit rotation of the first and second planar members around the first end of the electronic device, and a rotational hinge configured to couple together the first ends of the first and second planar members such that the second planar member is rotatable with respect to the first planar member.

20 Claims, 15 Drawing Sheets

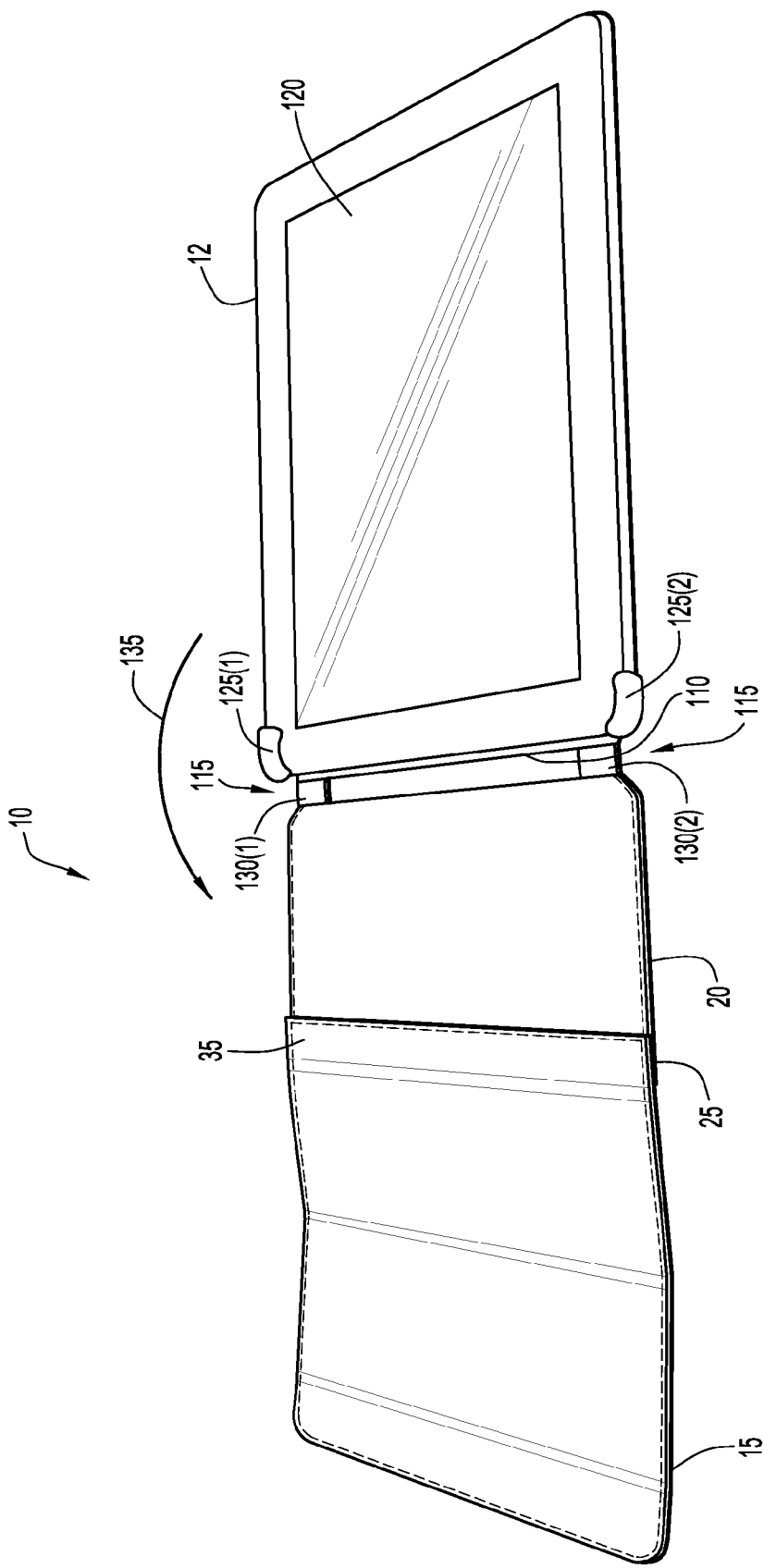

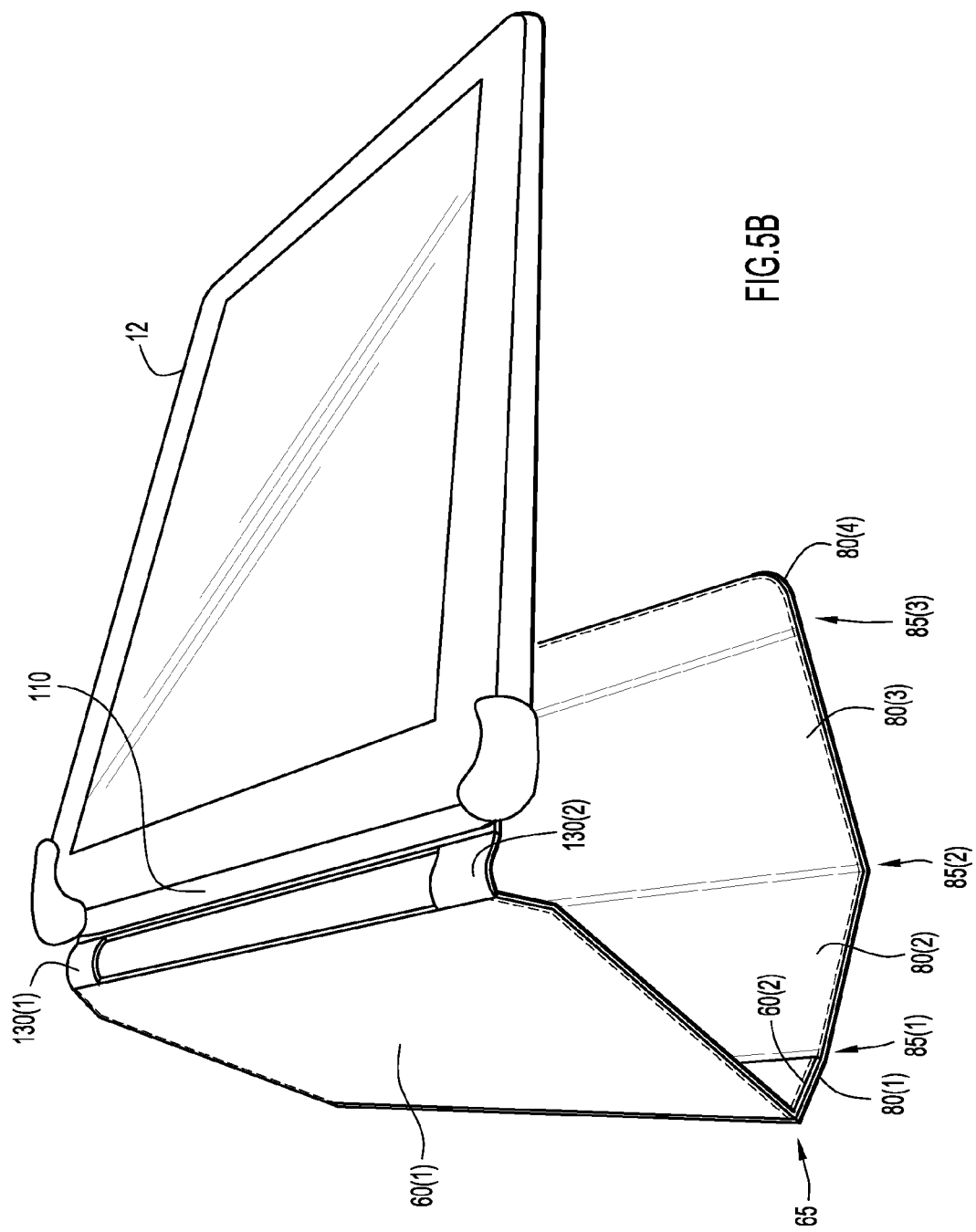

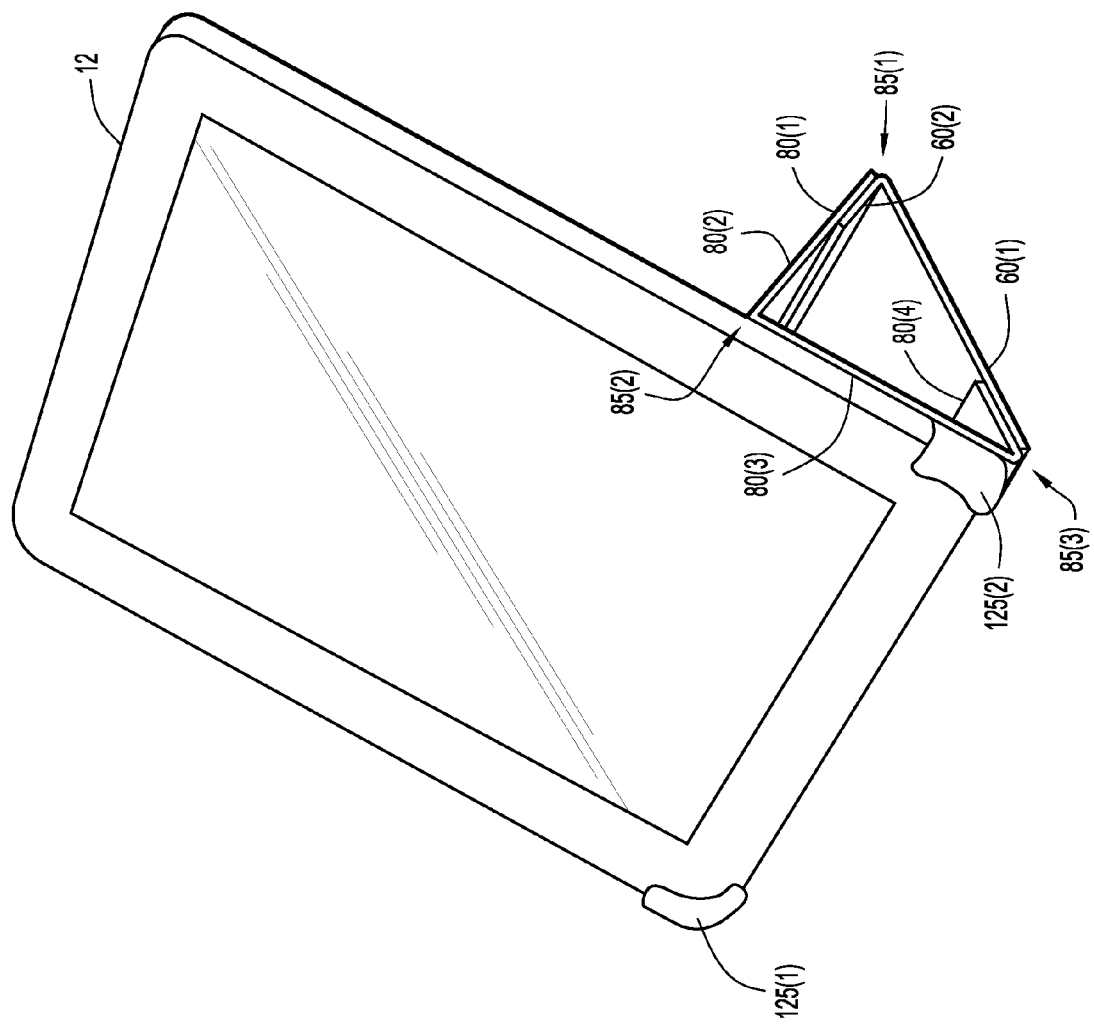

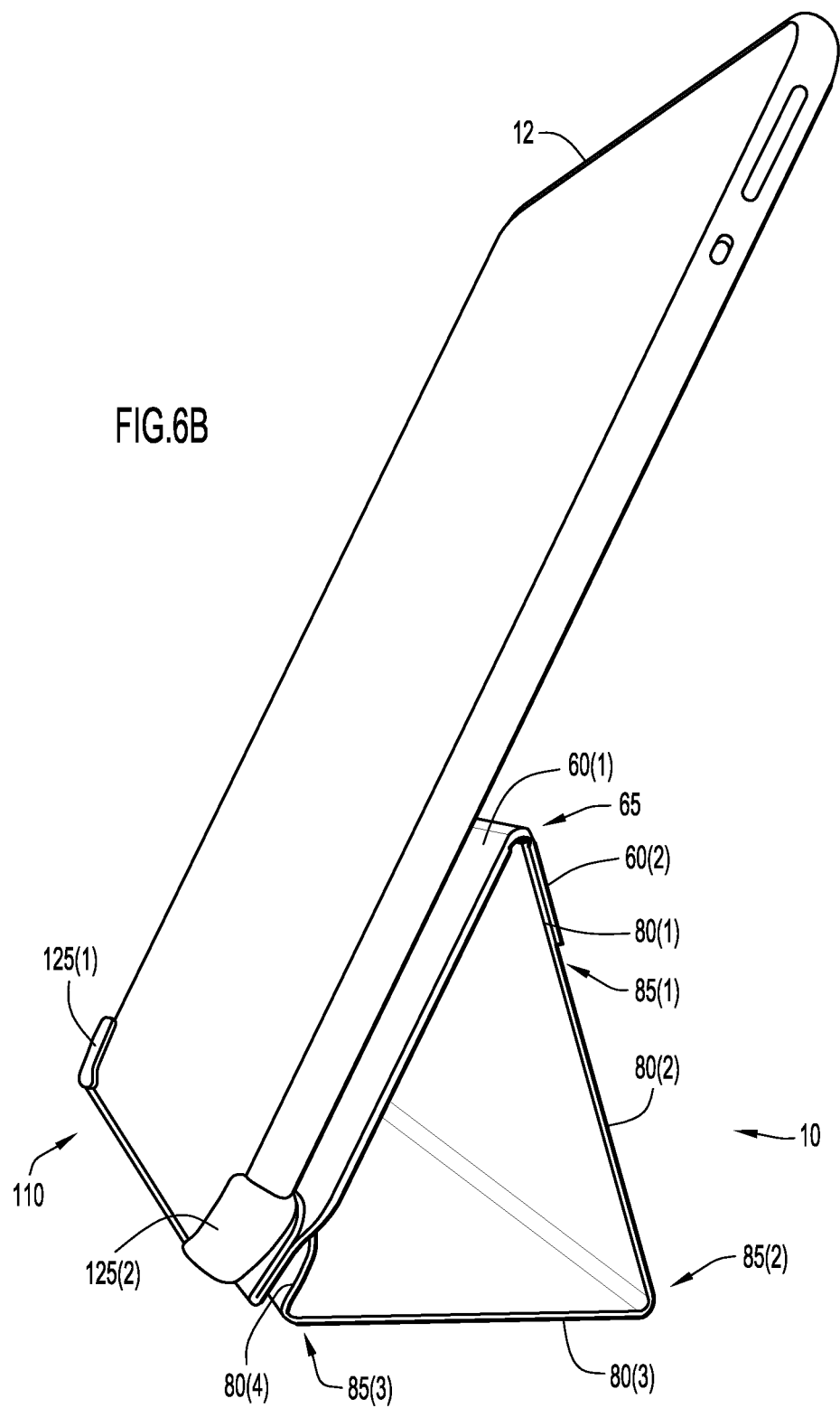

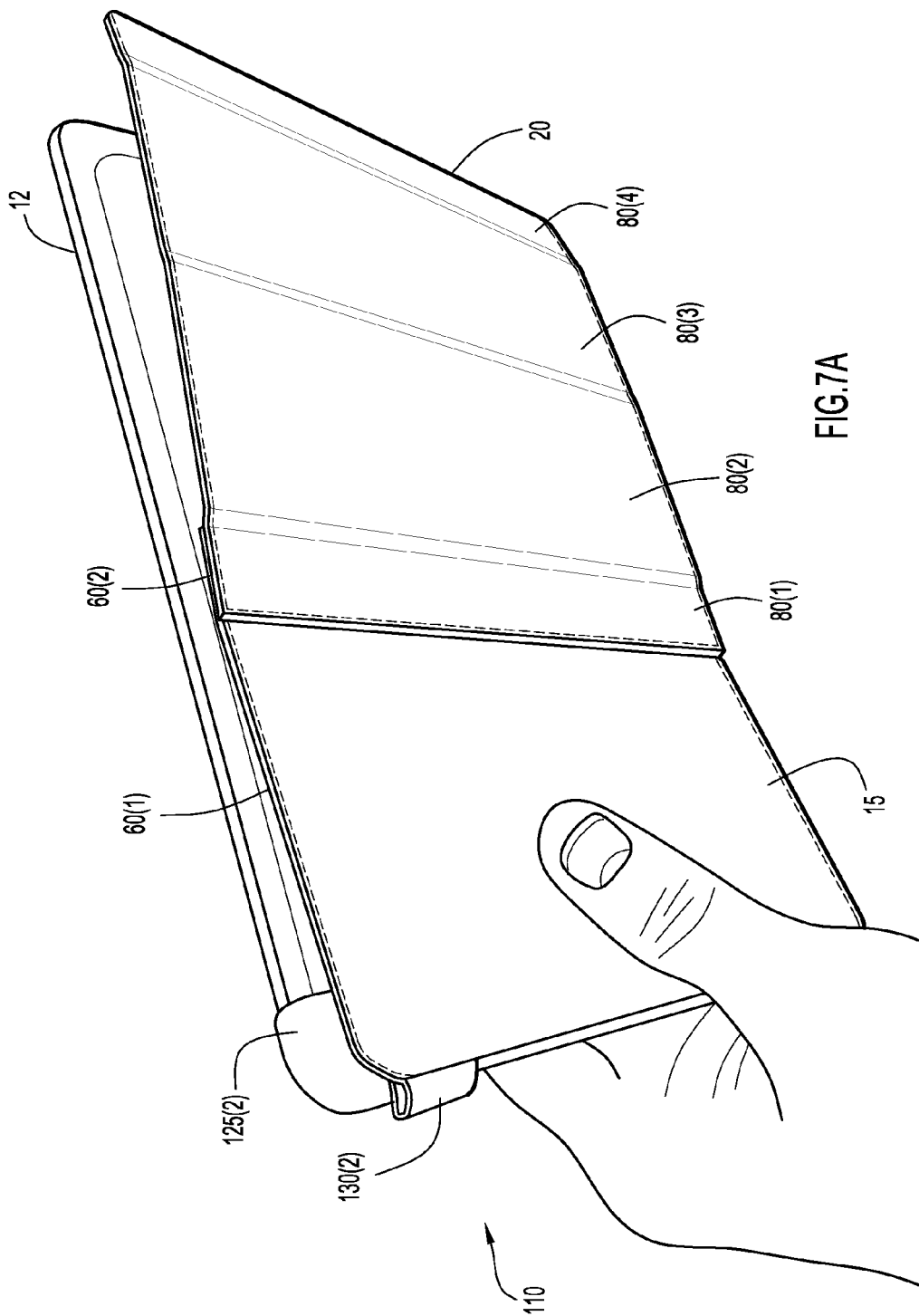

MULTI-MODAL ELECTRONIC DEVICE COVER

TECHNICAL FIELD

The present disclosure relates generally to a cover for an electronic device.

BACKGROUND

A portable electronic device typically includes one or more interfaces through which a user can interact with the device. In the context of portable electronic devices such as mobile phones, personal digital assistants (PDAs), navigation devices, tablet computers, etc., the user interface may be a large (relative to the size of the device) display screen (e.g., display panel, touch panel, etc.). These display screens are generally disposed on, or integrated with, the housing of the electronic device.

During use, an electronic device may be exposed to impacts, or to the environment. Because the display screen is generally formed from a material that is susceptible to breakage upon impact, a user may wish to protect the display screen of the device when not in use.

SUMMARY

In accordance with certain embodiments, a cover for an electronic device is provided. The cover includes a first planar member and a second planar member, wherein a first end of the second planar member is disposed adjacent to a first end of the first planar member. The cover also comprises a coupling arrangement configured to be attached to a first end of the electronic device and configured to permit rotation of the first and second planar members around the first end of the electronic device. The cover further includes a rotational hinge configured to couple together the first ends of the first and second planar members such that the second planar member is rotatable with respect to the first planar member, and a first releasable locking arrangement configured to, when the cover is in a flat configuration, releasably fasten together the first ends of the first and second planar members so as to prevent rotation of the second planar member about the rotational hinge.

BRIEF DESCRIPTION OF THE DRAWINGS

Embodiments are described herein in conjunction with the accompanying drawings, in which:

FIGS. 5A-5D illustrate the use of the multi-modal cover in a configuration to support an electronic device.

FIGS. 6A-6B illustrate the use of the multi-modal cover in another configuration to support an electronic device.

FIGS. 7A-7E illustrate the use of the multi-modal cover in a further configuration to support an electronic device.

DESCRIPTION OF EXAMPLE EMBODIMENTS

Figure 1:
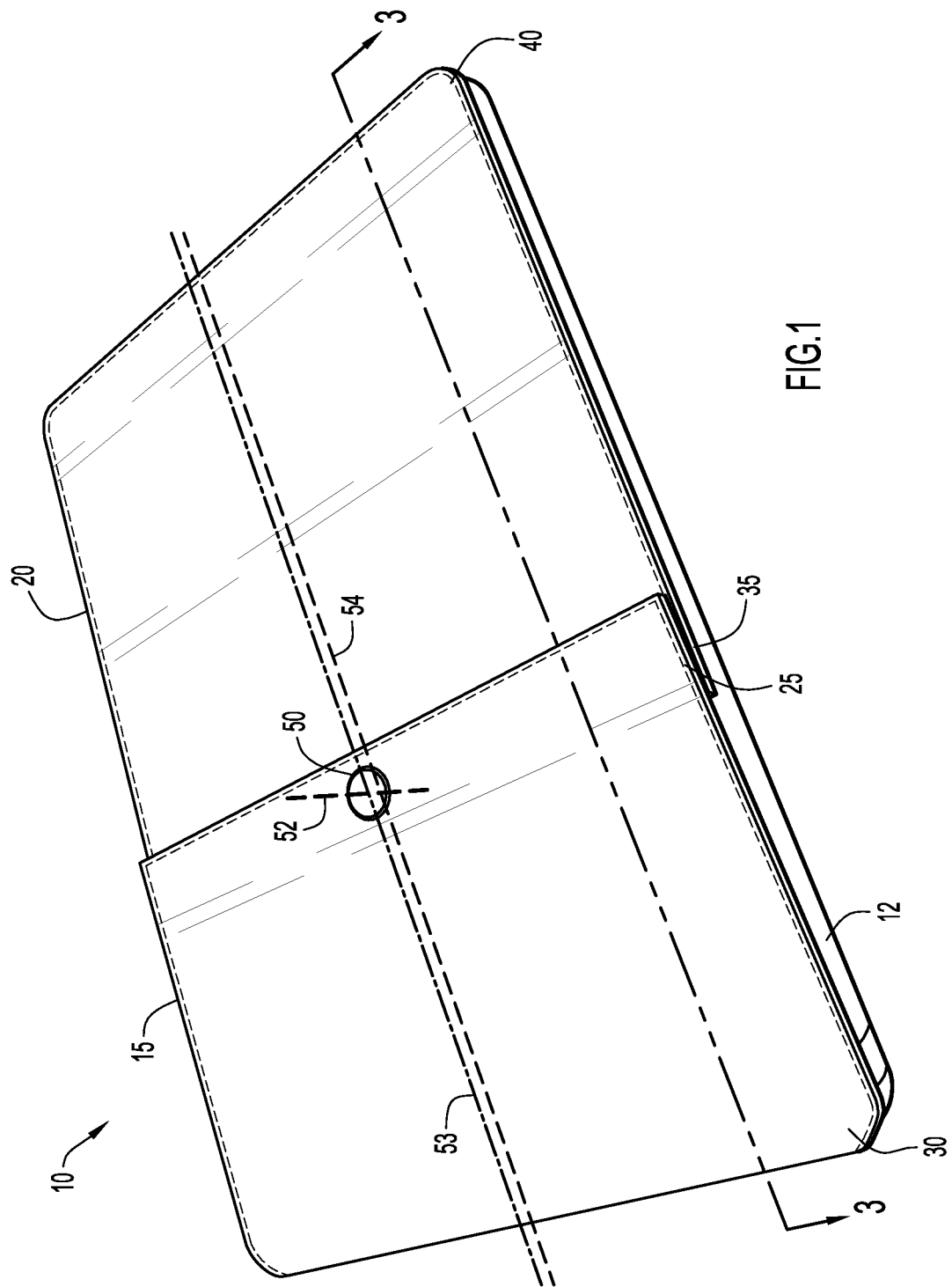
FIG. 1 is a perspective view of a multi-modal electronic device cover.

FIG. 1 is a perspective view of a cover 10 for a portable electronic device, such as a mobile phone, personal digital assistant (PDA), navigation device, tablet computer, etc., that is configured to take a number of different configurations or "modes." Due to these different possible configurations, cover 10 is sometimes referred to herein as a multi-modal cover. In the perspective view of FIG. 1, multi-modal cover 10 is shown covering a display screen of a tablet computer 12.

As shown in FIG. 1, multi-modal cover 10 may include a first substantially planar member 15 and a second substantially planar member 20. First member 15 comprises a first end 25 and an opposing second end 30. Similarly, second member 20 comprises a first end 35 and an opposing second end 40. As described further below, first member 15 and second member 20 each comprise a plurality of sections (not shown in FIG. 1) separated by foldable or bendable regions (also not shown in FIG. 1).

In FIG. 1, the first end 35 of the second member 20 is disposed below first end 25 of the first member 15. That is, first end 35 is disposed between first end 25 and the display screen of tablet computer 12. First ends 25 and 35 are mechanically coupled to one another by a rotational hinge 50. Rotational hinge 50 is a mechanical element that allows rotation of second member 20 relative to first member 15, but retains the first ends 25 and 35 together and adjacent to one another. More specifically, rotational hinge 50 allows rotation of second member 50 around the hinge in a plane that is substantially parallel to first member 15. In a first or flat configuration of FIG. 1, an elongate axis 52 extends through rotational hinge 50 and is substantially perpendicular to the surfaces of first and second members 15 and 20, respectively. An axis 53 extends from second end 30 to first end 15 in first member 15 through rotational hinge 50. Axis 53 is substantially parallel to an axis 54 that extends from first end 35 to second end 40 in second member 20 through rotational hinge 50. Axes 53 and 54 are substantially perpendicular to hinge axis 52. Further details of the rotation of rotational hinge 50 and the coupling together of first ends 25 and 35 are provided below.

It is to be appreciated that multi-modal cover 10 may be constructed from any combination of one or more suitable materials to, for example, provide a particular aesthetic finish, desired level of protection, and/or to, as described below, to function as a stand or support for the electronic device. The materials can include, for example, polyester microfiber, polycarbonate fiber, polyurethane adhesive, polyester knit, leather, or polyurethane.

In one example, the multi-modal cover 10 can be, at least partially, constructed from a hard material designed to resist impacts while, in another example, the cover can be constructed from a softer material, but include one or more hard elements to provide impact resistance and underlying structure. In some embodiments, multi-modal cover 10 can be constructed by combining several different materials having different physical/mechanical properties. In one such arrangement, several different materials can be layered (stacked) to form one of first member 15 or second member 20. The different materials can be layered in different orders and arrangements. For example, the material stack can include a soft material to be placed in contact with the device, a hard material (e.g., fiberglass) to withstand impacts, and a stain-resistant or water-resistant material (e.g., polyurethane, microfiber, leather, etc.) to provide an aesthetically pleasing outer surface for the cover. Additionally, as described further below, one or other structural or functional elements may be embedded or otherwise disposed in different portions of multi-modal cover 10.

Figure 2:
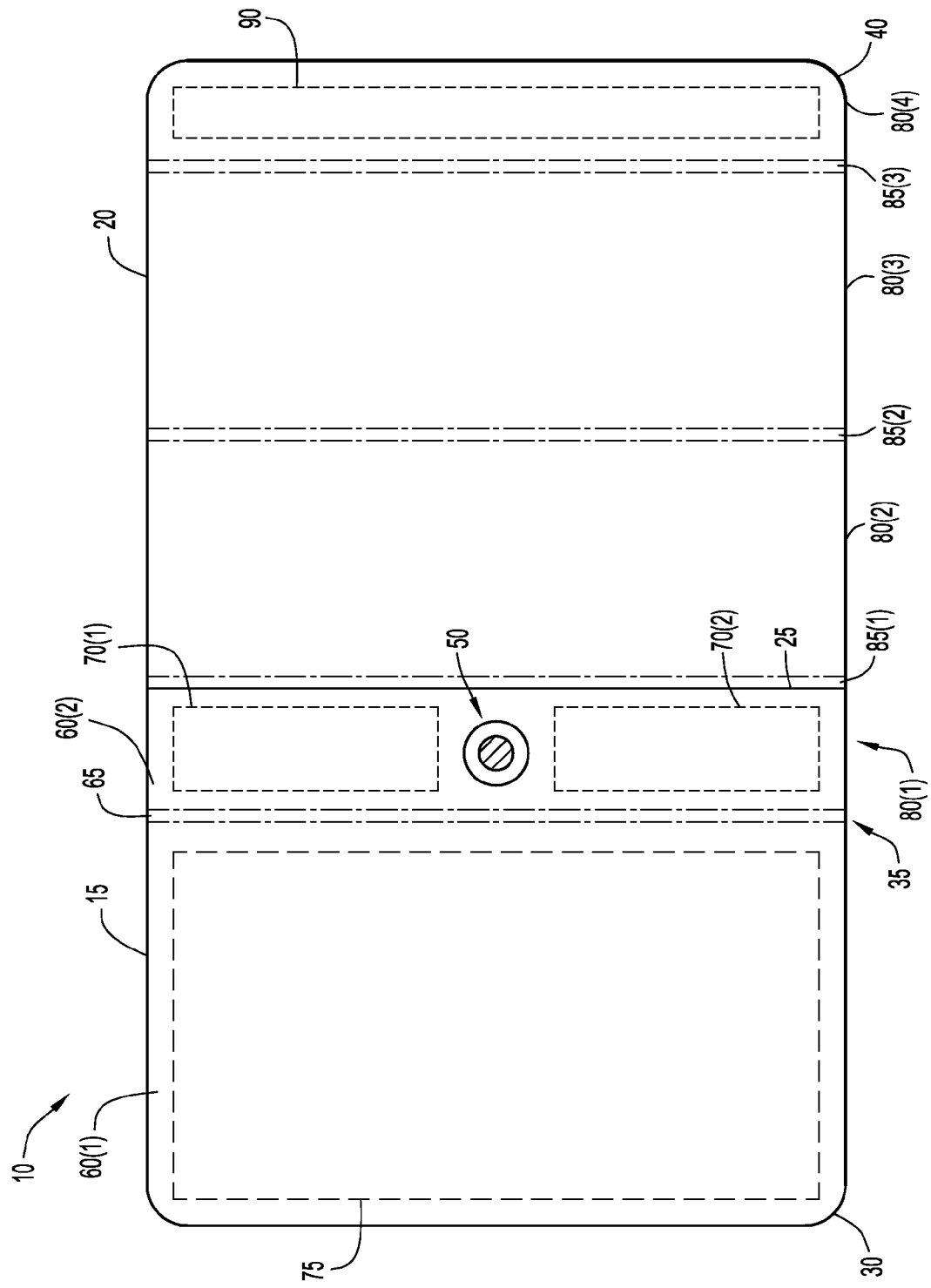
FIG. 2 is a top view of the multi-modal cover illustrating components disposed in the cover.

FIG. 2 is schematic top view of multi-modal cover 10 that illustrates additional structural details of the first member 15 and the second member 20. Because FIG. 2 is a top view, structural elements that may be disposed in cover 10 are shown using hashed/dotted lines.

In this view, first end 35 of second member 20 is disposed underneath first end 25 of first member 15. First member 15 comprises two co-planar sections 60(1) and 60(2) separated by a bendable region 65. In this embodiment, bendable region 65 comprises an area that includes only soft material so that first member 15 can fold (bi-directionally) at region 65. Disposed in section 60(2) are first and second bar magnets 70(1) and 70(2) positioned on either side of rotational hinge 50.

First member 15, more specifically section 60(1), also includes a metallic element 75. In this specific example of FIG. 2, metallic element 75 is a rectangular plate. In other arrangements, metallic element may comprise, for example, one or more elongate metallic bars extending across section 60(1), a frame (e.g., square, H-shaped, figure 8-shaped), etc.

Second member 20 comprises four co-planar sections 80(1), 80(2), 80(3), and 80(4) separated by bendable regions 85(1), 85(2), and 85(3), respectively. In FIG. 2, section 80(1) and a portion (approximately half) of bendable region 85(1) are positioned underneath section 60(2) of first member 15. Additionally, disposed in section 80(1) are bar magnets 72(1) and 72(2). Bar magnets 72(1) and 72(2) are not shown in FIG. 2. When multi-modal cover 10 is in the first configuration (i.e., flat configuration) of FIG. 2, the magnets 72(1) and 72(2) in section 80(1) are configured to be aligned, or in registration with, magnets 70(1) and 70(2), respectively, of section 60(2) so as to be magnetically coupled thereto. When magnetically coupled, the magnets 70(1) and 72(1) and the magnets 72(1) and 72(2) are collectively configured to substantially prevent rotation of second member 20 around rotational hinge 50 unless an external rotational force is applied by a user. Disposed in section 80(4) (i.e., the second end 40 of second member 20) is an elongate bar magnet 90.

First member 15 and second member 20 are each configured to bend (at regions 65 and 85(1)-85(3), respectively), so that cover 10 may take several different configurations (i.e., different modes). As described further below, these different modes are such that cover 10 may function as a stand for an electronic device, such as tablet computer 12 (FIG. 1). In certain examples described below, multi-modal cover 10 is configurable as a stand that supports an electronic device in different upright configurations.

Figure 3:
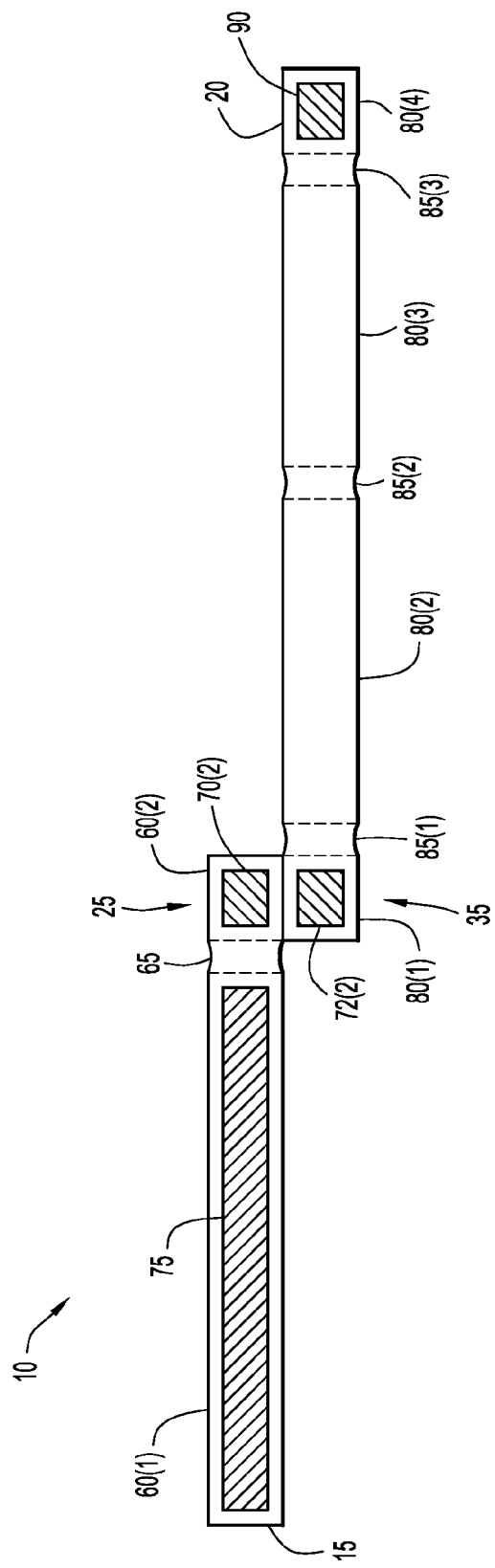
FIG. 3 is a cross-sectional view of the multi-modal cover.

FIG. 3 is a simplified cross-sectional view of multi-modal cover 10, taken along cross-sectional line 3-3 of FIG. 1. When multi-modal cover 10 is in the illustrated flat configuration, the cover is configured to be disposed over a surface, such as a display screen, of an electronic device. For ease of illustration, the electronic device has been omitted from FIG. 3. Also for ease of illustration, first member 15 and second member 20 are shown in FIG. 3 as being substantially parallel. It is to be appreciated that, in certain arrangements, first member 15 and second member 20 may be angled with respect to one another.

As shown, section 60(2) of the first member 15 is disposed over section 80(1) of second member 20. That is, the first end 35 of the second member 20 is disposed underneath first end 25 of the first member 15. In this flat configuration, magnets 70(2) and 72(2), as well as magnets 70(1) and 72(1), are positioned adjacent to one another so as to magnetically mate. Also shown in FIG. 3 is metallic element 75 in section 60(1) (of first member 15) and magnet 90 in section 80(4) (of second member 20).

As noted above, first member 15 comprises first and second sections 60(1) and 60(2), respectively, separated by a bendable region 65. Similarly, second member 20 comprises third, fourth, fifth, and sixth sections 80(1)-80(4), respectively, separated by bendable regions 85(1), 85(2), and 85(3), respectively. In the example of FIG. 3, bendable regions 65 and 85(1)-85(3) are formed by soft material that allows bi-directional folding at the regions. It is to be appreciated that, in alternative arrangements, bendable regions 65 and 85(1)-85(3) may be formed from alternative materials or mechanism. For example, in one alternative arrangement bendable regions 65 and 85(1)-85(3) may be formed by mechanical hinges that allow the bi-directional folding of first and second members 15 and 20, respectively.

Figure 4:
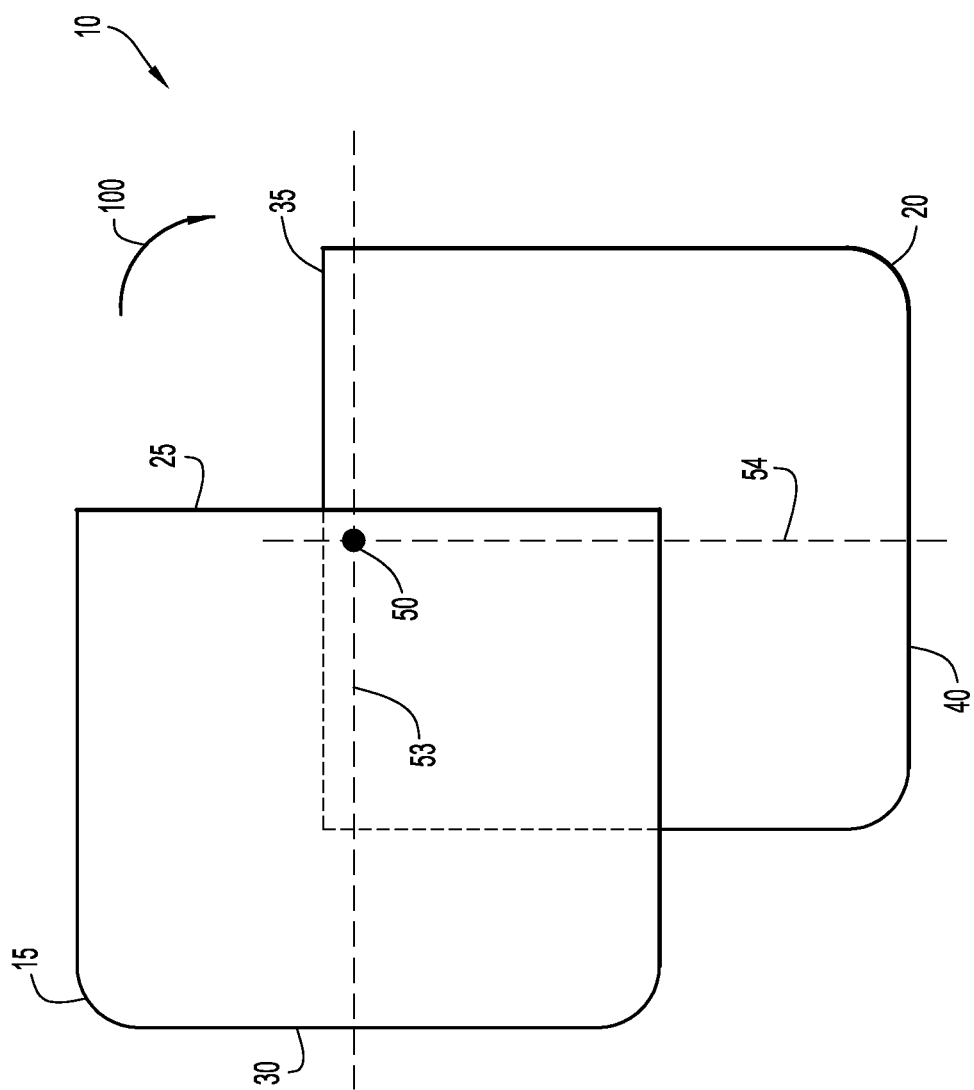
FIG. 4 is a top view of multi-modal cover in a rotated position.

As noted above, second member 20 is coupled to first member 15 by a rotational hinge 50 that allows rotation of the second member with respect to the first member. FIG. 4 is a schematic top view illustrating cover 10 when second member 20 is rotated with respect to the first member 15.

As noted above, in the flat configuration of FIG. 1, axis 54 through second member 20 (i.e., the elongate axis extending from first end 35 to second end 40 through rotational hinge 50) is substantially parallel to axis 53 (i.e., the elongate axis extending from first end 25 to second end 30 through rotational hinge 50). However, in the arrangement of FIG. 4, second member 20 is rotated in the direction of arrow 100 such that axis 54 is substantially perpendicular to axis 53. That is, as shown, second member 20 is rotated within a plane that is parallel first member 15.

When second member 20 is rotated such that axis 54 is substantially perpendicular to hinge axis 52, magnet 72(2) (not shown in FIG. 4) in first end 35 of the second member 20 is positioned adjacent to a portion of metallic element 75 (also not shown in FIG. 4) near the center of section 60(1). As such, magnet 72(2) is configured to magnetically couple to metallic element 75 to retain second member 20 in the rotated position. In an optional embodiment, second member 20, and more specifically section 80(2) and/or section 80(3), may include a metallic element therein so as to couple to magnet 70(1) in first member 15, thereby further retaining second member 20 in the rotated position.

FIGS. 1-4 illustrate the use of a first releasable locking arrangement that fastens together the first ends 25 and 35 of the first and second members 15 and 20, respectively. More specifically, in the above embodiments, the magnets 70(1) and 70(2), along with magnets 72(1) and 72(2), comprise the first releasable locking arrangement. It is to be appreciated that different releasable locking arrangements may be used in alternative embodiments. For example, in one alternative embodiment, the first releasable locking arrangement may comprise opposing hook-and-loop fasteners (e.g., VEL-CRO® brand hook-and-loop fasteners). VELCRO® is a registered trademark of Velcro Industries B. V., Claude Debussylaan 24, 1082 MD Amsterdam, The Netherlands. In this embodiment, the one or more opposing hook-and-loop fasteners are disposed on each of the first end 25 and the first end 35 such that, when the cover is in the flat configuration, the one or more hook-and-loop fasteners mechanically mate. In another alternative embodiment, the first releasable locking arrangement may comprise re-usable adhesive disposed on one or more of the first ends 25 or 35.

As noted above, multi-modal cover 10 is configured to adopt a number of different configurations in which the cover may function as a stand for an electronic device. For ease of illustration, the following examples illustrate the use of multi-modal cover 10 as a stand for tablet computer 12. It is to be appreciated that these examples are merely illustrative and that multi-modal cover 10 may be used with a number of other portable electronic devices such as mobile phones, PDAs, navigation devices, computers, etc.

Figure 5C:
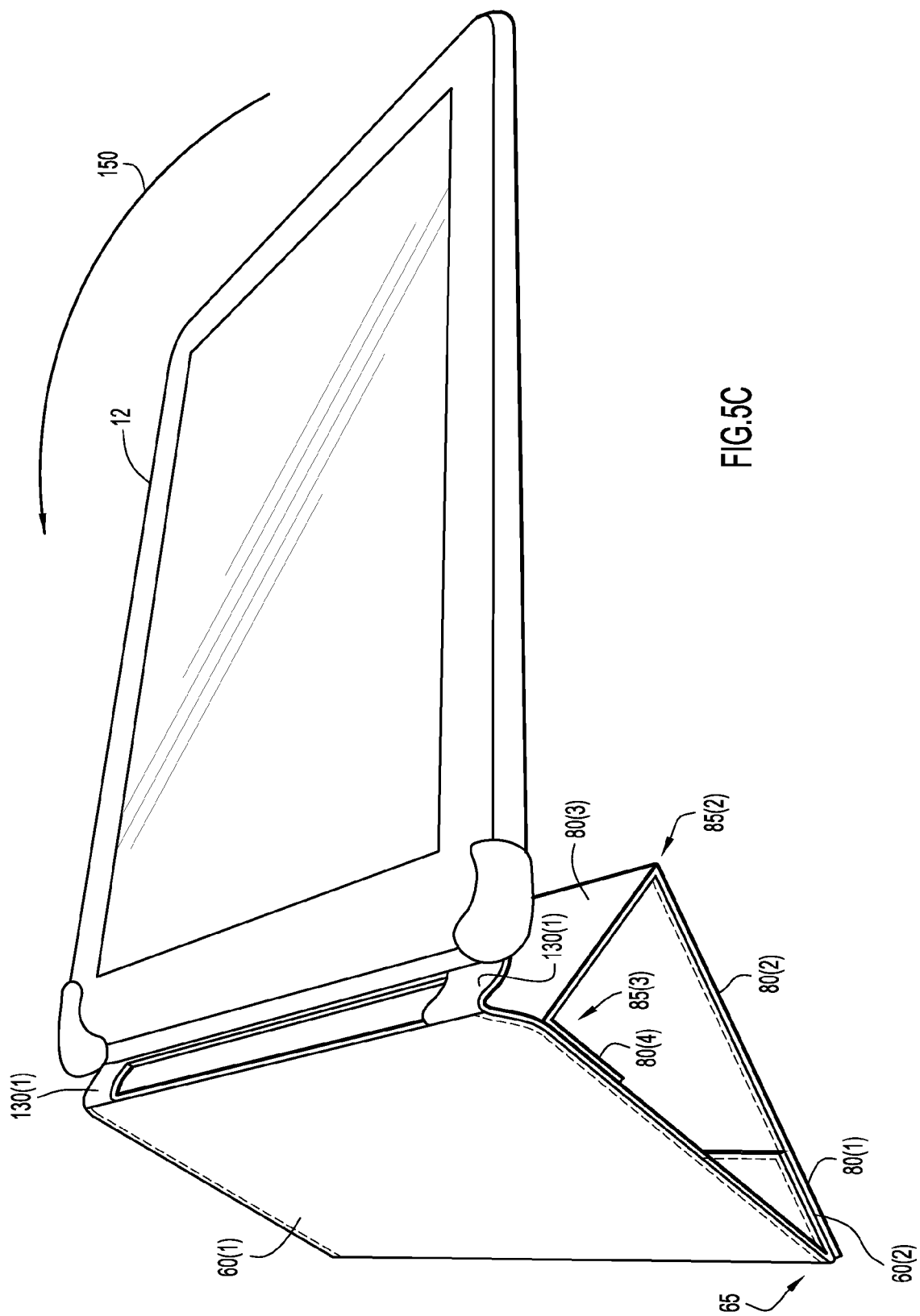
Figure 6A:
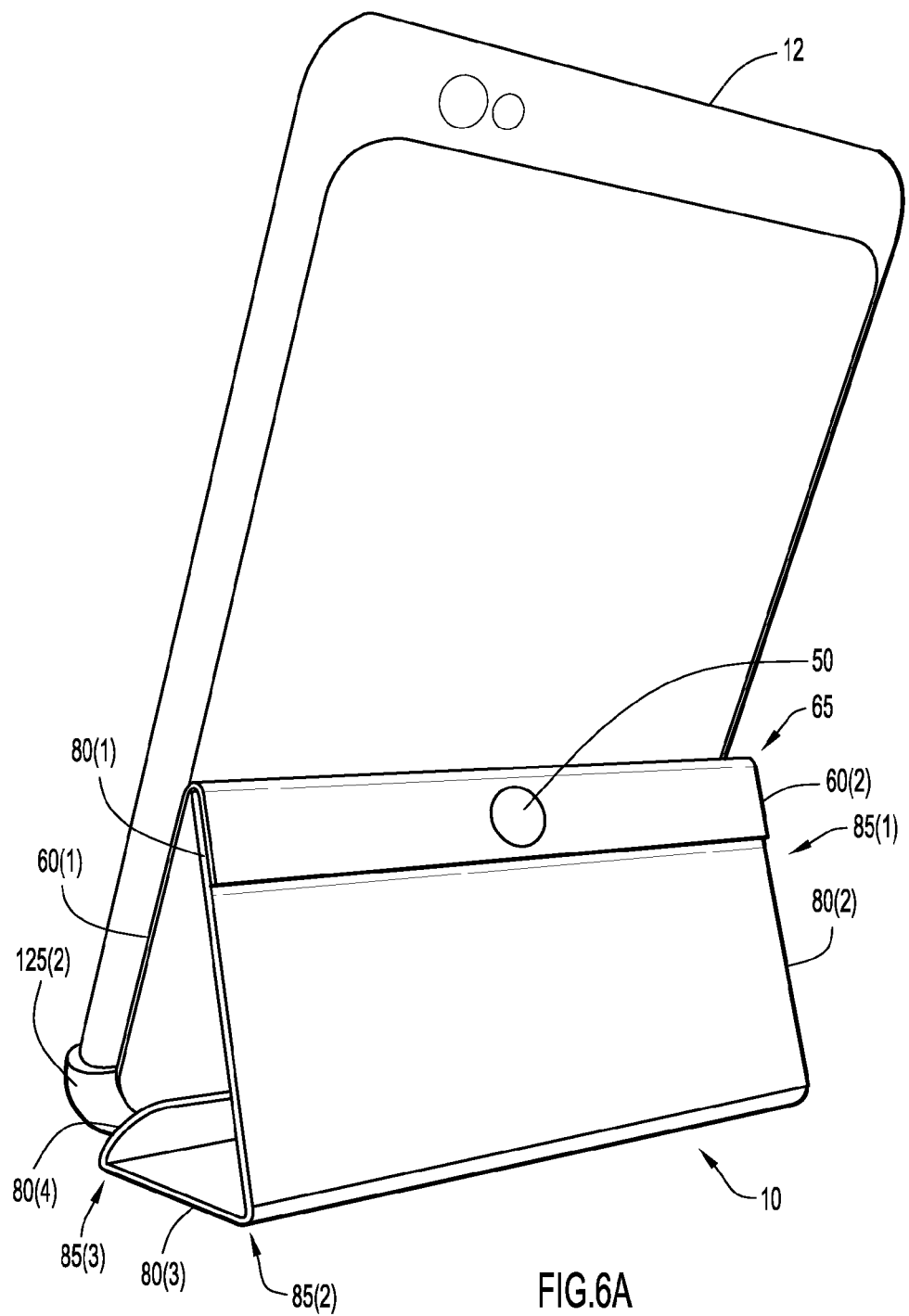

Tablet computer 12, as well as many other electronic devices, generally have a rectangular shape in which two edges (sides) are longer than the other two edges (ends) of the device. Additionally, such rectangular shaped devices will display different screens, depending on the orientation of the device. For example, when the electronic device is oriented so that one of the shorter edges (ends) is facing downwards (i.e., the short portion of the rectangle is downwards), the electronic device is said to be in a vertical orientation and the device operates in a "portrait" mode of operation. When the electronic device is oriented so that one of the longer edges (sides) is facing downwards (i.e., the long portion of the rectangle is downwards), the electronic device is said to be in a horizontal orientation and the device operates in a "landscape" mode of operation. FIGS. 5A-5C collectively illustrate the transition or conversion of multi-modal cover 10 from the flat configuration of FIGS. 1-3 to a configuration arranged to support tablet computer 12 in a portrait mode of operation. This second configuration of cover 10 is sometimes referred to herein as the "portrait configuration". FIGS. 6A-6B illustrate an alternative portrait configuration. FIGS. 7A-7E collectively illustrate the conversion of multi-modal cover 10 from the flat configuration of FIGS. 1-3 to a configuration arranged to support tablet computer 12 in a landscape mode of operation. This second configuration of cover 10 is sometimes referred to herein as the "landscape configuration".

In FIG. 5A, multi-modal cover 10 is coupled to a first end 110 of tablet computer 12 by a coupling arrangement 115 that permits rotation of the cover around the first end 110. That is, coupling arrangement 115 allows cover 10 to "flip" open so as to expose the display screen 120 of the tablet computer 12.

In the example of FIG. 1, coupling arrangement 115 comprises releasable tabs 125(1) and 125(2) configured to mechanically mate with tablet computer 12. More specifically, tabs 125(1) and 125(2) may have elastic or spring-form properties so as to releasably "clip" onto the outer surface of tablet computer 12.

Coupling arrangement 115 also comprises hinges 130(1) and 130(2) attached to tabs 125(1) and 125(2), respectively. Hinges 130(1) and 130(2) comprise a flexible (e.g., bendable) material of sufficient length to permit rotation of cover 110 around first end 110.

It is to be appreciated that the specific coupling arrangement 115 of FIG. 5A is merely illustrative and that other mechanisms for attaching the cover to tablet computer 12 may be used in alternative arrangements. For example, in alternative arrangements, coupling arrangement 115 may use adhesive, hook-and-loop fasteners (e.g., VELCRO® brand hook-and-loop fastener), touch fasteners, elastic band(s), etc. Similarly, hinges 130(1) and 130(2) may be formed from a number of different materials or may be mechanical hinges.

As shown in FIG. 5A, a first step to convert multi-modal cover 10 from the flat configuration to a first portrait configuration is to fold cover 10 around first end 110 in the direction shown by arrow 135. After cover 10 is rotated, first end 35 of second member 20 is now on top of first end 25 of first member.

FIG. 5B shows a second intermediate step to covert multimodal cover 10 to a portrait configuration. In this example, cover 10 is folded at bendable region 65 (first member 15) and at bendable region 85(2) (second member 20). Additionally, as shown, cover 10 is rotated, at hinges 130(1) and 130(2), further around first end 110 of tablet computer 12.

FIG. 5C illustrates another intermediate arrangement in which cover 10 is further folded at bendable regions 65, 85(2), and 85(3). More specifically, bendable region 85(3) of second member 20 is folded such that section 80(4) is adjacent to section 60(1) of first member 15. As shown, after section 80(4) is folded adjacent to section 60(1), cover 10 has an elongate triangular shape that supports (i.e., functions as a stand for) tablet computer 12. Sections 80(2) and 60(2) are configured to rest against a surface (e.g., table).

In the arrangement of FIG. 5C, the magnet 90 in section 80(4) is configured to magnetically couple to metallic element 75 in section 60(1) so as to releasably lock cover 10 into the triangular shape. As such, magnet 90 and metallic element 75 collectively comprise a releasable locking arrangement that functions to retain the triangular shape.

In certain circumstances, a user may operate tablet computer 12 when cover 10 is in the arrangement of FIG. 5C. Alternatively, the user may rotate cover 10, and tablet computer 12, in the direction shown by arrow 150 (FIG. 5C) so that the cover and tablet computer 12 are in a more upright position, as shown in FIG. 5D. In the example of FIG. 5D, cover 10 still has a triangular shape, but sections 60(1) and 60(2) are configured to rest against a surface, and section 80(3) is configured to rest against tablet computer 12.

As described above, FIGS. 5A-5D illustrate a first example conversion of cover 10 from the flat configuration to a portrait configuration. FIGS. 6A and 6B are perspective and side views, respectively, of cover 10 in a second portrait configuration reachable through a second conversion process.

In the second conversion process of FIGS. 6A and 6B, multi-modal cover 10 is first rotated around first end 110 of tablet computer 12 (i.e., rotation of hinges 130(1) and 130(2)) such that the cover is adjacent the back (i.e., the surface opposite from display screen 120) of tablet computer 12. That is, cover 10 is rotated approximately 180 degrees around first end 110. Next, cover 10 is folded, at bendable region 65, away from tablet computer 12, and then folded towards tablet computer 12 at bendable region 85(2) so as to bring section 80(4) proximate to first end 110. Cover 10 is then folded at bendable region 85(3) so that the outer surface of section 80(4) is abutting the inner surface of section 60(1). As shown, after section 80(4) is folded so as to be abutting section 60(1), cover 10 has an elongate triangular shape that supports (i.e., functions as a stand for) tablet computer 12. In this configuration, section 80(3) is configured to rest against a surface (e.g., table).

Figure 7B:
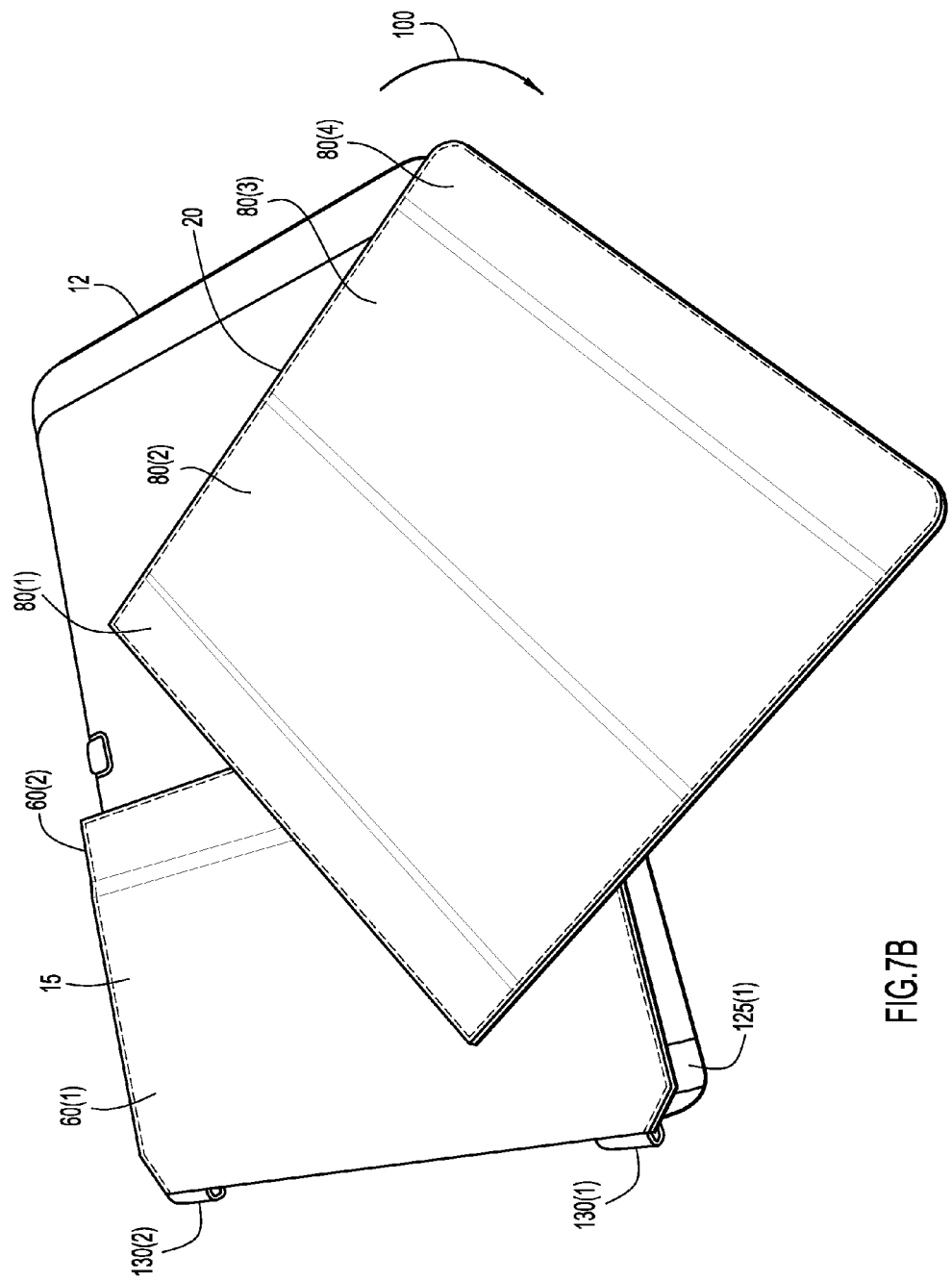

As previously noted, FIGS. 7A-7E illustrate the conversion of multi-modal cover 10 from the closed or first configuration of FIGS. 1-4 to a landscape configuration. More specifically, FIG. 7A illustrates a first step in the landscape conversion in which cover 10 is first rotated around first end 110 of tablet computer 12 (i.e., rotation of hinges 130(1) and 130(2)) such that cover is adjacent the back of tablet computer 12.

Next, as shown in FIG. 7B, second member 20 is rotated, as described above with reference to FIG. 4, in the direction of arrow 100 so that, after the rotation, axis 54 (FIG. 4) of second member 20 is substantially perpendicular to axis 53 (FIG. 4). FIG. 7B illustrates second member 20 when it is only partially rotated (i.e., rotated approximately 45 degrees). As noted above, when second member 20 is fully rotated (i.e., rotated 90 degrees such that axis 54 is substantially perpendicular to axis 53), magnet 72(2) (not shown in FIG. 7B) in section 80(1) (i.e., the first end 35 of the second member 20) is positioned adjacent to metallic element 75 (also not shown in FIG. 7B) of section 60(1). As such, magnet 72(2) is configured to magnetically couple to metallic element 75 to retain second member 20 in the rotated position. In an optional embodiment, second member 20, and more specifically section 80(2) and/or section 80(3), may include a metallic element therein, or be at least partially formed from a metallic material, so as to couple to magnet 70(1) in first member 15 to further retain second member 20 in the rotated position.

Figure 7C:
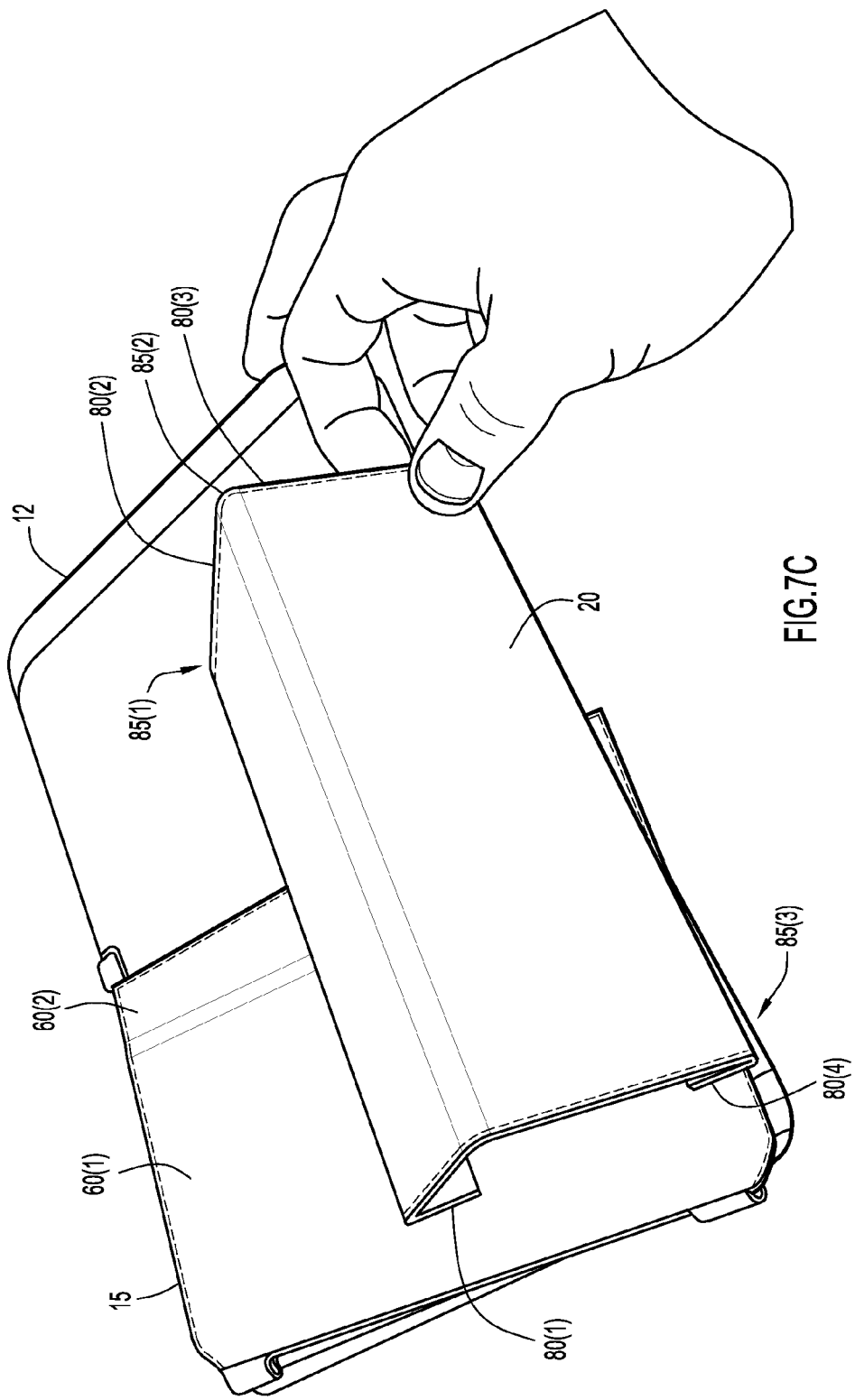

As shown in FIG. 7C, from the rotated position, second member 20 is next folded, at bendable region 85(2), back towards first member 15 (and tablet computer 12). Similarly, second member 20 is folded at bendable region 85(1) such that section 80(4) is abutting first member 15.

Figure 7D:
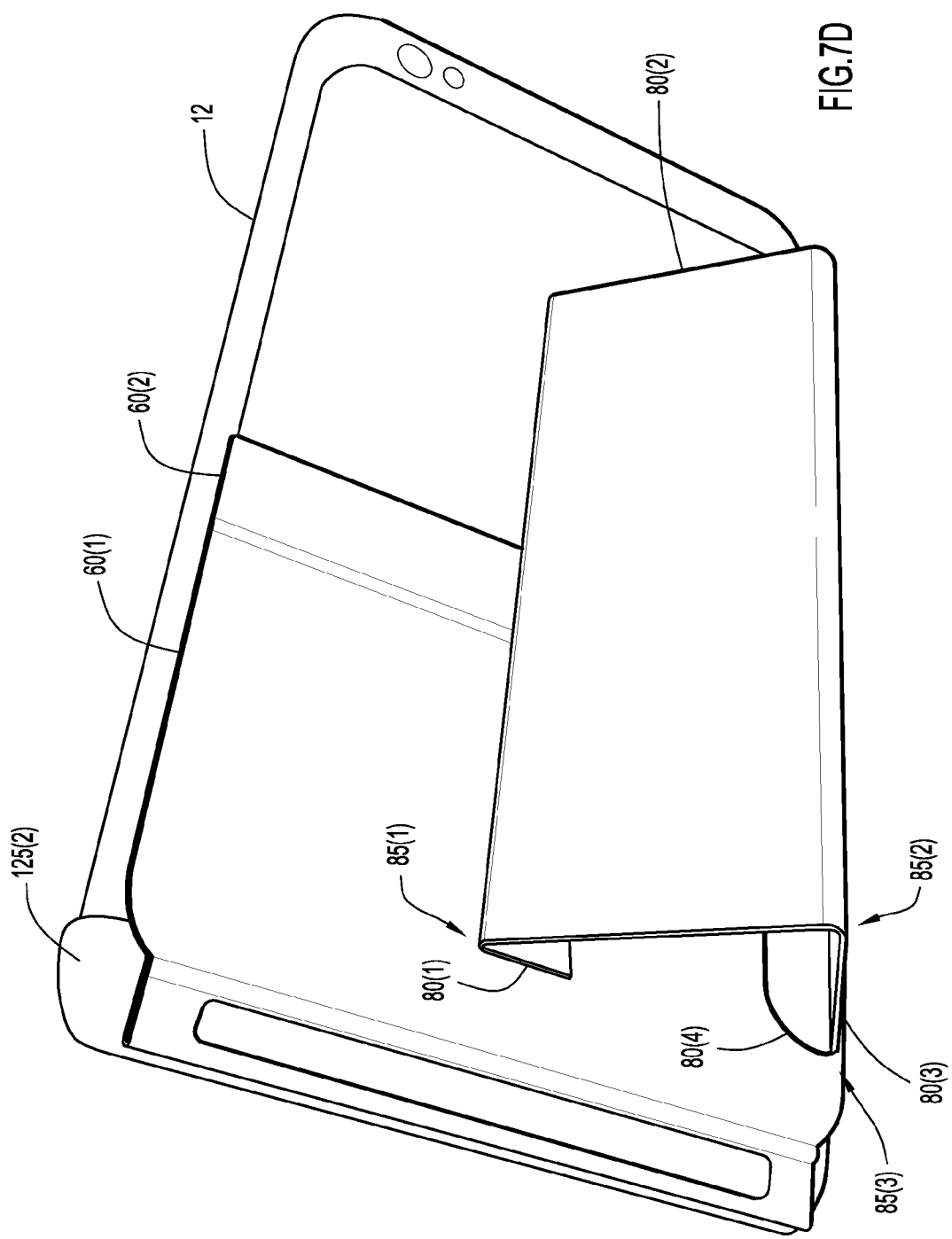
Figure 7E:
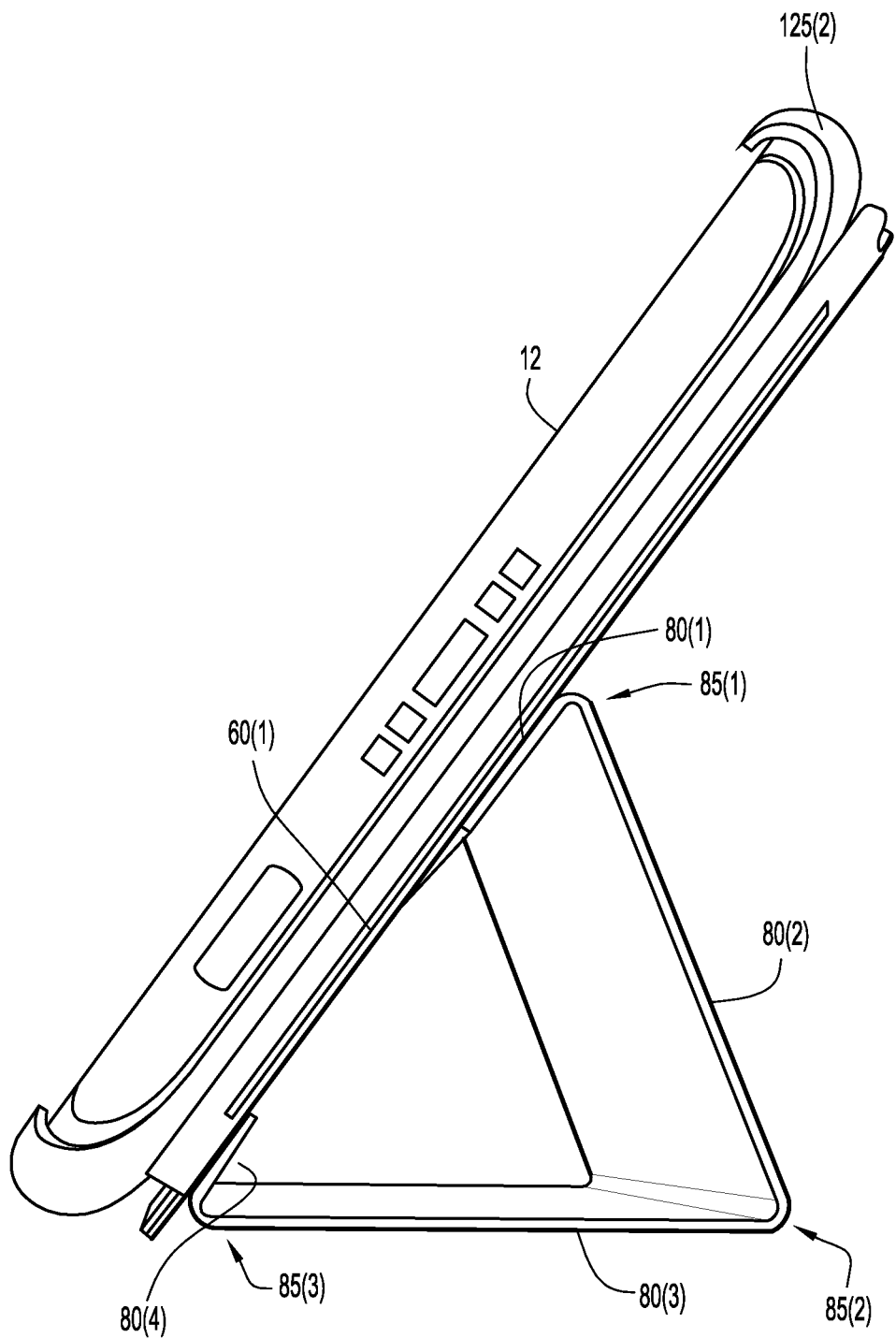

After section 80(4) is folded so as to be abutting first member 15, cover 10 has an elongate triangular shape that supports (i.e., functions as a stand for) tablet computer 12. In this configuration, section 80(3) is configured to rest against a surface (e.g., table). FIGS. 7D and 7E are perspective and side views, respectively, that illustrate the final landscape configuration of multi-modal cover 10.

In the arrangement of FIGS. 7C-7E, the magnet 90 (not shown in FIGS. 7C-7E) in section 80(4) is configured to magnetically couple to metallic element 75 (also not shown in FIGS. 7C-7E) in section 60(1) so as to releasably lock cover 10 into the triangular shape. As such, magnet 90 and metallic element 75 collectively comprise a releasable locking arrangement.

The above description is intended by way of example only.

What is claimed is:

1. A cover for an electronic device, comprising:
   a first planar member;
   a second planar member, wherein a first end of the second planar member is disposed adjacent to a first end of the first planar member;
   a coupling arrangement, configured to be attached to a first end of the electronic device and configured to permit rotation of the first and second planar members around the first end of the electronic device;
   a rotational hinge, configured to couple together the first ends of the first and second planar members such that the second planar member is rotatable with respect to the first planar member and in a plane parallel to the first planar member; and
   a first releasable locking arrangement, configured to, when the cover is in a flat configuration, releasably fasten together the first ends of the first and second planar members so as to prevent rotation of the second planar member about the rotational hinge.

2. The cover of claim 1, wherein the cover comprises a plurality of bendable regions such that the cover is configurable into an elongate triangular shape to support the electronic device in a substantially upright position.

3. The cover of claim 2, wherein the cover includes at least a second releasable locking arrangement such that the first and second planar members lock into the elongate triangular shape.

4. The cover of claim 2, wherein the cover is configurable into a first triangular shape to support the electronic device in a substantially upright position in which the electronic device operates in a portrait mode of operation.

5. The cover of claim 2, wherein the cover is configurable into a second triangular shape to support the electronic device in a substantially upright position in which the electronic device operates in a landscape mode of operation.

6. The cover of claim 5, wherein in the flat configuration an axis extends between the first and second ends of the first planar member through the rotational hinge; and wherein in the second triangular shape, the second planar member is in a rotated position in which an axis extends between the first and second ends of the second planar member through the rotational hinge is configured to be approximately perpendicular to the hinge axis.

7. The cover of claim 6, further comprising a third locking arrangement configured to retain the second member in the rotated position, and wherein the third locking arrangement comprises:
   one or more metallic elements disposed in the first planar member; and
   one or more magnets disposed in the second planar member configured to magnetically mate with the metallic element.

8. The cover of claim 1, wherein the first releasable locking arrangement comprises:
   one or more magnets disposed in each of the first ends of the first and second planar members such that, when the cover is in the flat configuration, the one or more magnets magnetically mate.

9. The cover of claim 1, wherein the first releasable locking arrangement comprises:
   one or more opposing hook-and-loop fasteners disposed on each of the first ends of the first and second planar members such that, when the cover is in the flat configuration, the one or more hook-and-loop fasteners mechanically mate.

10. The cover of claim 1, wherein the first releasable locking arrangement comprises:
    re-usable adhesive disposed on one or more of the first ends of the first and second planar members.

11. A cover for an electronic device, comprising:
    a first planar member, comprising at least one bendable region;
    a second planar member, comprising a plurality of bendable regions, wherein the bendable regions enable the cover to be configurable into an elongate triangular shape to support the electronic device in a substantially upright position;
    a coupling arrangement, configured to be attached to a first end of the electronic device and configured to permit rotation of the first and second planar members around the first end of the electronic device; and
    a rotational hinge, configured to couple together a first end of the first member to a first end of the second planar member such that the second planar member is rotatable with respect to the first planar member and in a plane parallel to the first planar member.

12. The cover of claim 11, wherein the first planar member comprises first and second co-planar sections and a first bendable region connecting the first and second co-planar sections, and wherein the second planar member comprises third, fourth, fifth, and sixth co-planar sections, and second, third, and fourth bendable regions connecting the third and fourth, fourth and fifth, and fifth and sixth sections, respectively.

13. The cover of claim 11, further comprising:
    a first releasable locking arrangement configured to, when the cover is in the flat configuration, releasably fasten together the first ends of the first and second planar members so as to prevent rotation of the second planar member about the rotational hinge.

14. The cover of claim 13, wherein the first releasable locking arrangement comprises:
    one or more magnets, disposed in each of the first ends of the first and second planar members such that, when the cover is in a flat configuration, the one or more magnets magnetically mate.

15. The cover of claim 11, wherein the cover includes at least a second releasable locking arrangement such that the first and second planar members lock into the elongate triangular shape.

16. The cover of claim 11, wherein the cover is configurable into a first triangular shape to support the electronic device in a substantially upright position in which the electronic device operates in a portrait mode of operation.

17. The cover of claim 11, wherein the cover is configurable into a second triangular shape to support the electronic device in a substantially upright position in which the electronic device operates in a landscape mode of operation.

18. The cover of claim 17, wherein in a flat configuration an axis extends between the first and second ends of the first planar member through the rotational hinge; and wherein in the second triangular shape, the second planar member is in a rotated position in which an axis extends between the first and second ends of the second planar member through the rotational hinge is configured to be approximately perpendicular to the hinge axis.

19. The cover of claim 17, wherein the cover includes a third locking arrangement configured to retain the second member in the rotated position, and wherein the third locking arrangement comprises:
  one or more metallic elements, disposed in the first planar member; and
  one or more magnets, disposed in the second planar member and configured to magnetically mate with the metallic element.

20. A cover for an electronic device, comprising:
a first planar member;
a second planar member, wherein a first end of the second planar member is disposed adjacent to a first end of the first planar member;
coupling means for attaching the first planar member to a first end of the electronic device and configured to permit rotation of the first and second planar members around the first end of the electronic device;
rotational hinge means for coupling together the first ends of the first and second planar members such that the second planar member is rotatable with respect to the first planar member; and
releasable locking means for, when the cover is in a flat configuration, releasably fastening together the first ends of the first and second planar members so as to prevent rotation of the second planar member about the rotational hinge.

* * * * *